US012610364B2

(12) United States Patent
Stevens et al.

(10) Patent No.: US 12,610,364 B2
(45) Date of Patent: Apr. 21, 2026

(54) SYSTEM AND APPARATUS FOR PASSIVE NETWORK MONITORING

(71) Applicant: The Johns Hopkins University, Baltimore, MD (US)

(72) Inventors: Brian W. Stevens, Elkridge, MD (US); Katherine M. Woolls, Baltimore, MD (US); Jacob M. Ray, Marriottsville, MD (US); Jared S. Everett, Washington, DC (US); Yongwen Yang, Columbia, MD (US); Benjamin E. Henty, Columbia, MD (US); Abdullahi A. Inshaar, Columbia, MD (US); Avik Dayal, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 285 days.

(21) Appl. No.: 18/213,822

(22) Filed: Jun. 24, 2023

(65) Prior Publication Data

US 2024/0073885 A1     Feb. 29, 2024

Related U.S. Application Data

(60) Provisional application No. 63/401,211, filed on Aug. 26, 2022.

(51) Int. Cl.
H04W 72/1263 (2023.01)
H04W 72/232 (2023.01)

(52) U.S. Cl.
CPC ..... H04W 72/1263 (2013.01); H04W 72/232 (2023.01)

(58) Field of Classification Search
CPC ........................ H04W 72/1263; H04W 72/232
(Continued)

(56) References Cited

U.S. PATENT DOCUMENTS 10,805,969 B2    10/2020 Samal
11,218,247 B2     1/2022 Lo et al.
(Continued)

OTHER PUBLICATIONS

Iterative Decoding of Gold Sequences (Year: 2015).*
(Continued)

*Primary Examiner* — Asad M Nawaz
*Assistant Examiner* — Hugh Mark Ashley
(74) *Attorney, Agent, or Firm* — Noah J. Hayward

(57) ABSTRACT

A method for determining control and scheduling information of a network includes receiving a radio frequency waveform having scrambled downlink control information (DCI), performing a cell search to determine cell identity information, performing a beam search and beam detection to estimate a signal quality of the waveform, decoding scheduling information associated with the waveform, detecting a control channel encoded with an unknown identity based on the scrambling identity and extracting resource elements of the control channel based on the scheduling information, attempting to decode the control channel via a re-encoding technique that is tested for accuracy and, in response to accuracy testing not passing, via a blind scrambling seed recovery technique, recovering the DCI based on the re-encoding technique or the blind scrambling seed recovery technique, and obtaining the control and scheduling information from the DCI.

20 Claims, 13 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 11,677,496 | B2 | 6/2023 | Lo et al. | |
| 2010/0144363 | A1* | 6/2010 | De Rosa | H04W 72/52 |
| | | | | 455/452.1 |
| 2019/0110290 | A1* | 4/2019 | Sun | H04W 24/08 |
| 2022/0295405 | A1* | 9/2022 | Seo | H04W 52/0235 |
| 2024/0365308 | A1* | 10/2024 | Gao | H04W 72/53 |

OTHER PUBLICATIONS

Swarun Kumar et al., "LTE Radio Analytics Made Easy and Accessible," SIGCOMM '14: Proceedings of the 2014 ACM conference on SIGCOMM, Aug. 17, 2014, pp. 211-222.
Robert Falkenberg et al., "Client-Based Control Channel Analysis for Connectivity Estimation in LTE Networks," 2016 IEEE 84th Vehicular Technology Conference (VTC—Fall), Montreal, QC, Canada, 2016, pp. 1-6.
Nicola Bui et al., "OWL: a Reliable Online Watcher for LTE Control Channel Measurements," AllThingsCellular '16, Proc. Annu. Int. Conf. Mob. Comput. Networking, MOBICOM, DOI: http://dx.doi.org/10.1145/2980055.2980057, 2016, pp. 25-30.
Robert Falkenberg et al., "FALCON: An Accurate Real-Time Monitor for Client-Based Mobile Network Data Analytics," 2019 IEEE Global Communications Conference (GLOBECOM), Waikoloa, HI, USA, 2019, pp. 1-7.
Brian W. Stevens et al., "Physical Layer and MAC Design for Self-Reliant Cognitive Multicast Networks Using LTE Resources," IEEE Transactions on Cognitive Communications and Networking, vol. 7, No. 3, Sep. 2021, pp. 818-833.
Malgorzata Wasilewska et al., "Machine Learning for LTE Energy Detection Performance Improvement," Sensors 19(19), 4348, Oct. 8, 2019, pp. 1-19.
Igor Kim et al., "SDR-based 5G NR Control Channel Analysis Equipment for Network Monitoring," 2020 International Conference on Information and Communication Technology Convergence (ICTC), 2020, pp. 1060-1063.
Mathieu Des Noes et al., "Iterative decoding of Gold sequences," 2015 IEEE International Conference on Communications (ICC), Signal Processing for Communications Symposium, 2015, pp. 4840-4845.

Brian W. Stevens et al., "Cognitive Resource Analyzer for Cellular Network Ecosystems," IEEE Transactions on Cognitive Communications and Networking, vol. 8, No. 2, Jun. 2022, pp. 733-749.
Unknown, "Stingray phone tracker," website, https://en.wikipedia.org/wiki/Stingray_phone_tracker, last accessed Jul. 12, 2023, pp. 1-16.
Unknown, "L3HARRIS: Public Safety and Critical Communications," website, https://www.l3harris.com/all-capabilities/public-safety-and-critical-communications, last accessed Jul. 12, 2023, pp. 1-15.
Unknown, "L3HARRIS: Communications for Police and Law Enforcement," website, https://www.l3harris.com/all-capabilities/law-enforcement-communications, last accessed Jul. 12, 2023, pp. 1-7.
Unknown, "PMC Wireless: Public Safety," website, https://pmc-wireless.com/who-you-are/public-safety/, last accessed Jul. 12, 2023, pp. 1-5.
Timo Braysy et al., "Cognitive Techniques for Finding Spectrum for Public Safety Services," Defense Technical Information Center (DTIC) report RTO-MP-IST-092, Sep. 2010, pp. 2-1 - 2-10.
Robert L. Foster, Jr. et al., "Cognitive Radio Access Management for Public Safety Communications Systems" Proceedings of the SDR '09 Technical Conference and Product Exposition, 2009, pp. 1-6.
Dell Cameron et al., "Cops Turn to Canadian Phone-Tracking Firm After Infamous 'Stingrays' Become 'Obsolete'," website, https://gizmodo.com/american-cops-turns-to-canadian-phone-tracking-firm-aft-1845442778, last accessed Jul. 12, 2023, Oct. 2020, pp. 1-16.
Prasanth Karunakaran et al., "A Reference Signal based GLRT for Simultaneous Sensing and Reception in Cognitive LTE-A Systems," 2016 IEEE Wireless Communications and Networking Conference, Doha, Qatar, Apr. 3, 2016, pp. 1-6.
Ali Masood et al., "Surveying pervasive public safety communication technologies in the context of terrorist attacks," Physical Communication, 41, 101109, Apr. 29, 2020, pp. 1-29.
Abbass Nasser et al., "Spectrum Sensing for Cognitive Radio: Recent Advances and Future Challenge," Sensors, 21, 2408, Mar. 31, 2021, pp. 1-29.
Brian W. Stevens et al., "Detection Algorithm for Cellular Synchronization Signals in Airborne Applications," IEEE Access, vol. 9, Apr. 7, 2021, pp. 55555-55566.
Vasanthan Raghavan et al., "Millimeter Wave Channel Measurements and Implications for PHY Layer Design," IEEE Transactions on Antennas and Propagation, vol. 65, No. 12, Sep. 29, 2017, pp. 6521-6533.

* cited by examiner

1200

NEW RADIO NETWORK MONITOR

1210

PROCESSING CIRCUITRY

1214

MEMORY

1212

PROCESSOR

1220

DEVICE INTERFACE

1229

CONTROL MODULE

1228

ANTENNA ASSEMBLY

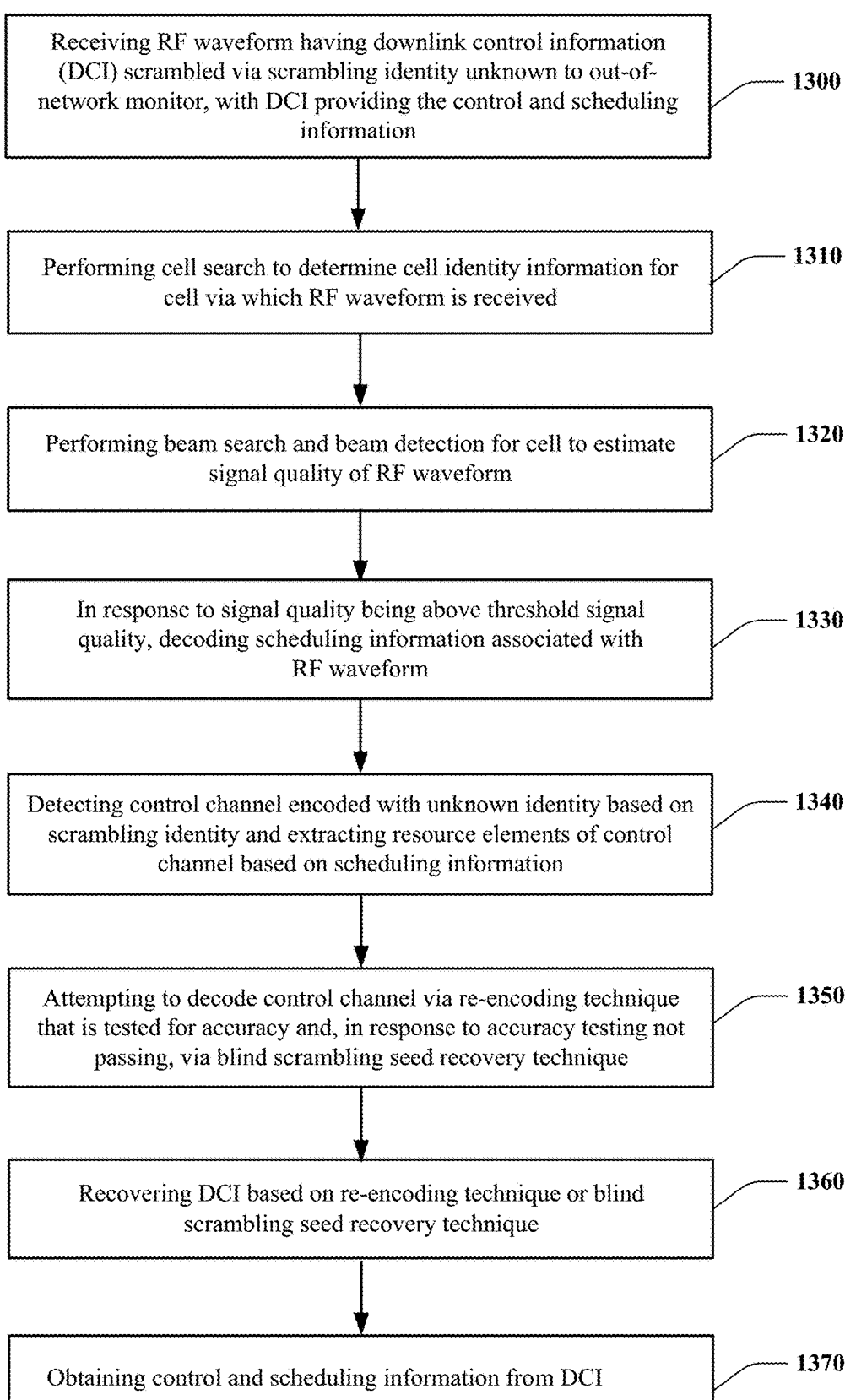

Receiving RF waveform having downlink control information (DCI) scrambled via scrambling identity unknown to out-of-network monitor, with DCI providing the control and scheduling information — 1300

Performing cell search to determine cell identity information for cell via which RF waveform is received — 1310

Performing beam search and beam detection for cell to estimate signal quality of RF waveform — 1320

In response to signal quality being above threshold signal quality, decoding scheduling information associated with RF waveform — 1330

Detecting control channel encoded with unknown identity based on scrambling identity and extracting resource elements of control channel based on scheduling information — 1340

Attempting to decode control channel via re-encoding technique that is tested for accuracy and, in response to accuracy testing not passing, via blind scrambling seed recovery technique — 1350

Recovering DCI based on re-encoding technique or blind scrambling seed recovery technique — 1360

Obtaining control and scheduling information from DCI — 1370

FIG. 13

SYSTEM AND APPARATUS FOR PASSIVE NETWORK MONITORING

CROSS-REFERENCE TO RELATED APPLICATIONS

This application claims priority to and the benefit of prior-filed, U.S. Provisional Application No. 63/401,211, filed on Aug. 26, 2022, the content of which is herein incorporated by reference in its entirety.

STATEMENT OF GOVERNMENTAL INTEREST

This invention was made with Government support under contract number DJF-16-1200-V-0008154 awarded by the U.S. Government. The Government has certain rights in the invention.

TECHNICAL FIELD

Example embodiments relate generally to wireless communications and, more particularly, relate to techniques for enabling passive network monitoring in a 5G NR context.

BACKGROUND

High speed data communications and the devices that enable such communications have become ubiquitous in modern society. The networks and devices that enable these communications have continued to develop and advance, driving improvement in reliability, efficiency, and quality of service all the way along. From so-called 3G (third generation) networks, through fourth generation (4G), and on to 4G Long Term Evolution (LTE) networks, the inexorable movement toward seamless and ever-present network access has continued to drive innovation.

The 5G (fifth generation) network is currently being rapidly developed, and corresponding "New Radio" technologies (i.e., 5G NR) have been evolving the landscape with equal rapidity. Meanwhile, passive monitoring of networks, including modern cellular infrastructure such as 4G LTE and 5G NR may be of interest for a number of reasons. Moreover, when engaging in such passive monitoring, it is preferable to be able to do so in a way that is both accurate and efficient. However, to date at least, no one has fully addressed the multiple issues that arise specifically in the context of passive monitoring of 5G NR networks.

In this regard, for example, passive network monitoring may generally include energy detection of the physical data channel and decoding of the physical control channel. However, without knowing certain information that in-network devices are provided, passive network monitoring from outside the network may be a complicated and difficult task. The typical complication and difficulty may be exacerbated for 5G NR. In particular, 5G NR has been the subject of certain changes that increase the level of difficulty associated with these tasks. Thus, determining the user Radio Network Temporary Identifier (RNTI) and decoding of certain control messages may be particularly challenging. Example embodiments may provide solutions for meeting these challenges.

BRIEF SUMMARY

In one example embodiment, a method for determining control and scheduling information of a network via an out-of-network monitor may be provided. The method may include receiving a radio frequency (RF) waveform having downlink control information (DCI) scrambled via a scrambling identity unknown to the out-of-network monitor, where the DCI provides the control and scheduling information. The method may further include performing a cell search to determine cell identity information via which the RF waveform is received, performing a beam search and beam detection for the cell to estimate a signal quality of the RF waveform and, in response to the signal quality being above a threshold signal quality, decoding scheduling information associated with the RF waveform. The method may further include detecting a control channel encoded with an unknown identity based on the scrambling identity and extracting resource elements of the control channel based on the scheduling information, attempting to decode the control channel via a re-encoding technique that is tested for accuracy and, in response to accuracy testing not passing, via a blind scrambling seed recovery technique, recovering the DCI based on the re-encoding technique or the blind scrambling seed recovery technique, and obtaining the control and scheduling information from the DCI.

In another example embodiment, an apparatus (e.g., a network monitor) for determining control and scheduling information of a network from outside the network may be provided. The apparatus may include processing circuitry that is configured for receiving an RF waveform having DCI scrambled via a scrambling identity unknown to the out-of-network monitor, where the DCI provides the control and scheduling information. The processing circuitry may be further configured for performing a cell search to determine cell identity information for a cell via which the RF waveform is received, performing a beam search and beam detection for the cell to estimate a signal quality of the RF waveform and, in response to the signal quality being above a threshold signal quality, decoding scheduling information associated with the RF waveform. The processing circuitry may be further configured for detecting a control channel encoded with an unknown identity based on the scrambling identity and extracting resource elements of the control channel based on the scheduling information, attempting to decode the control channel via a re-encoding technique that is tested for accuracy and, in response to accuracy testing not passing, via a blind scrambling seed recovery technique, recovering the DCI based on the re-encoding technique or the blind scrambling seed recovery technique, and obtaining the control and scheduling information from the DCI.

BRIEF DESCRIPTION OF THE DRAWINGS

Figure 1:
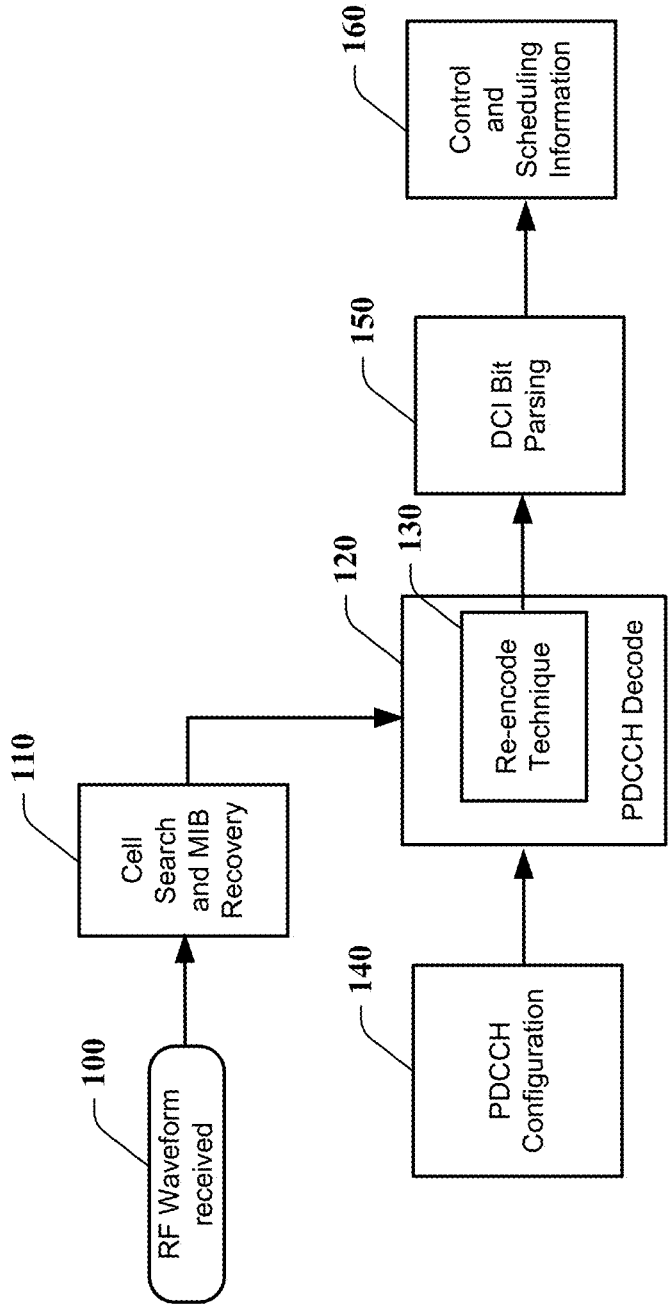
Figure 2:
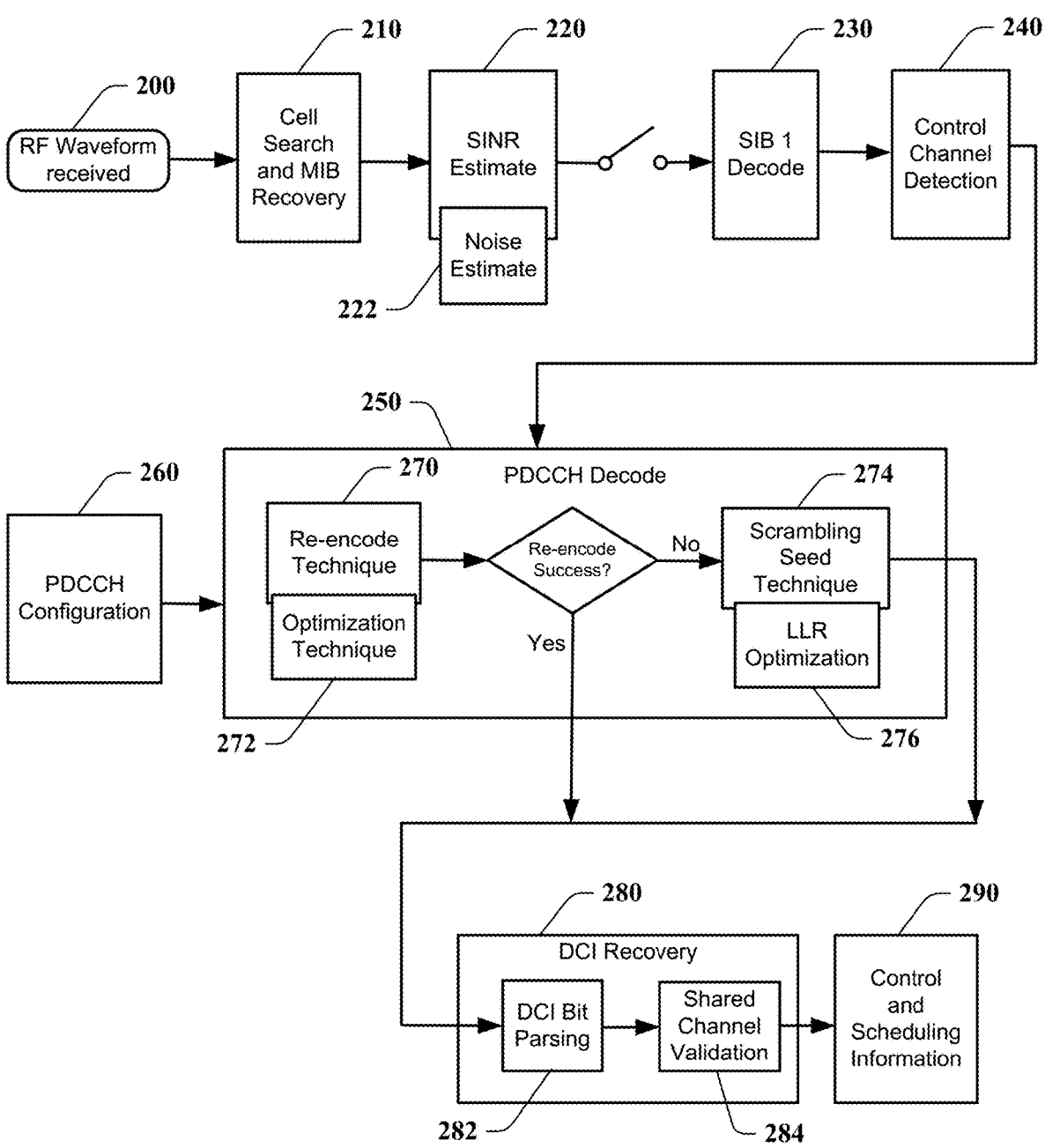
Figure 3:
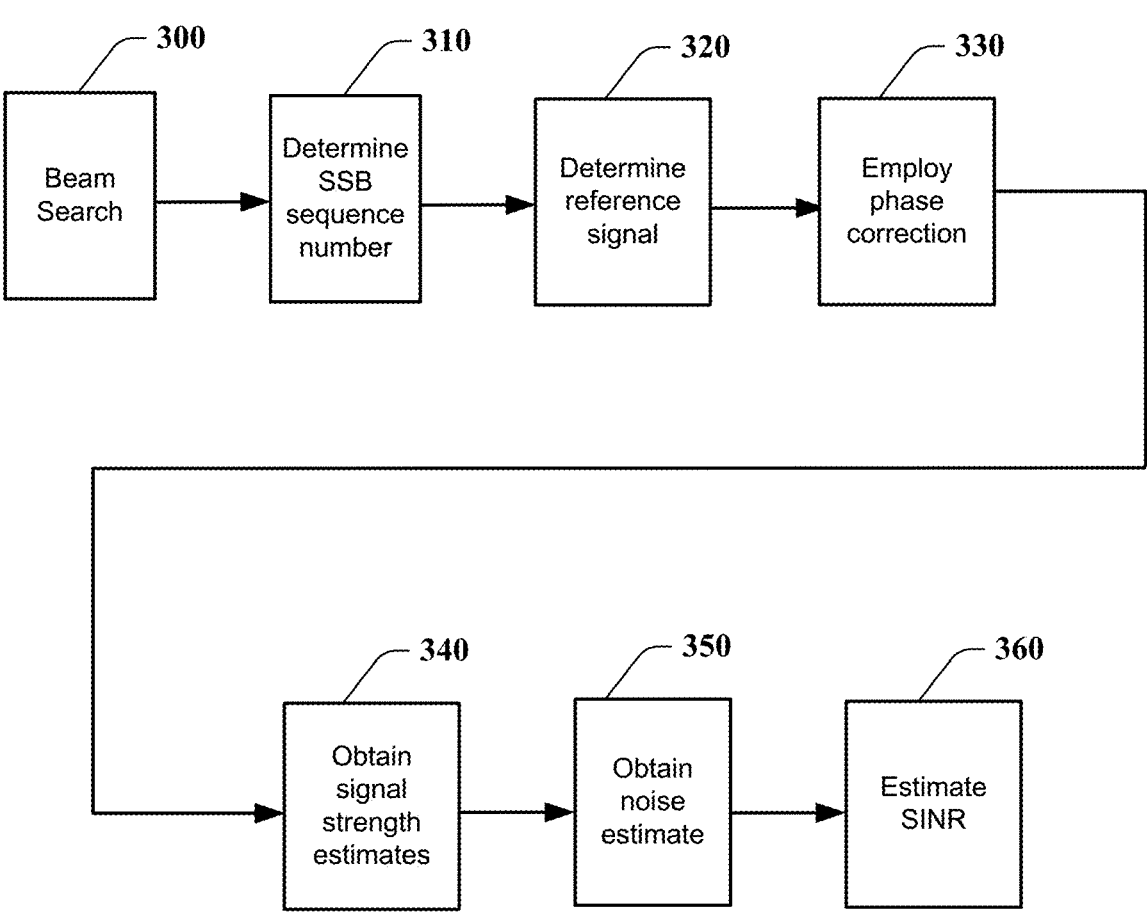
Figure 4:
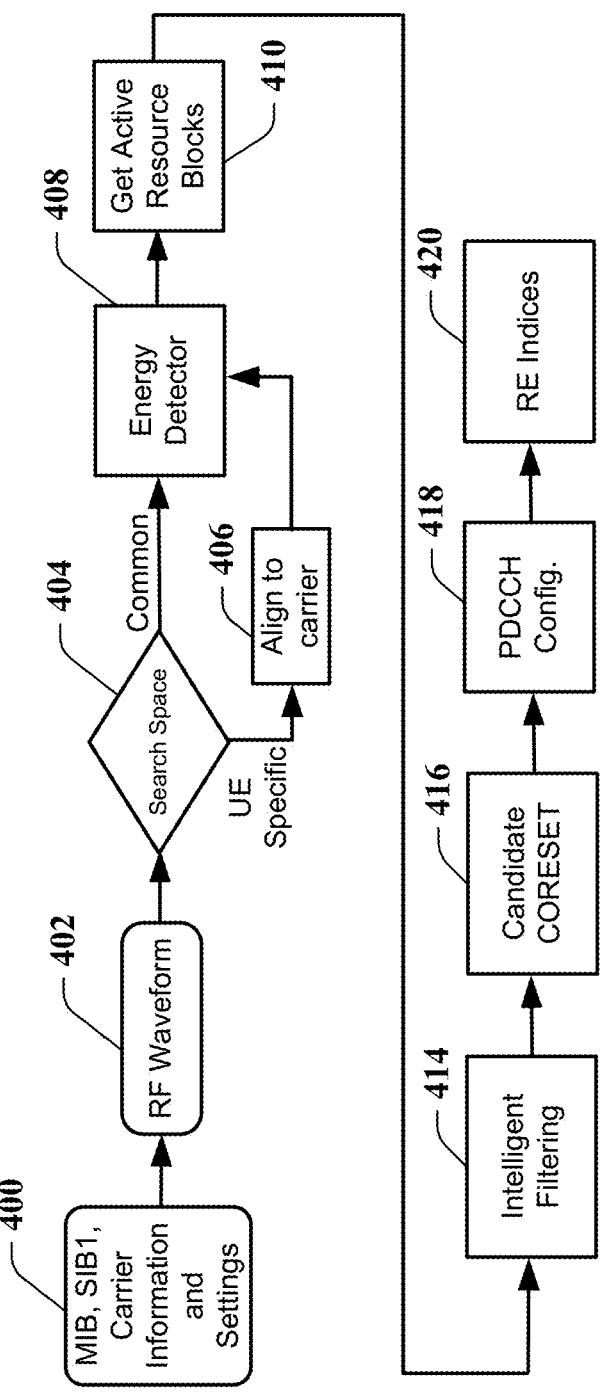
Figure 5:
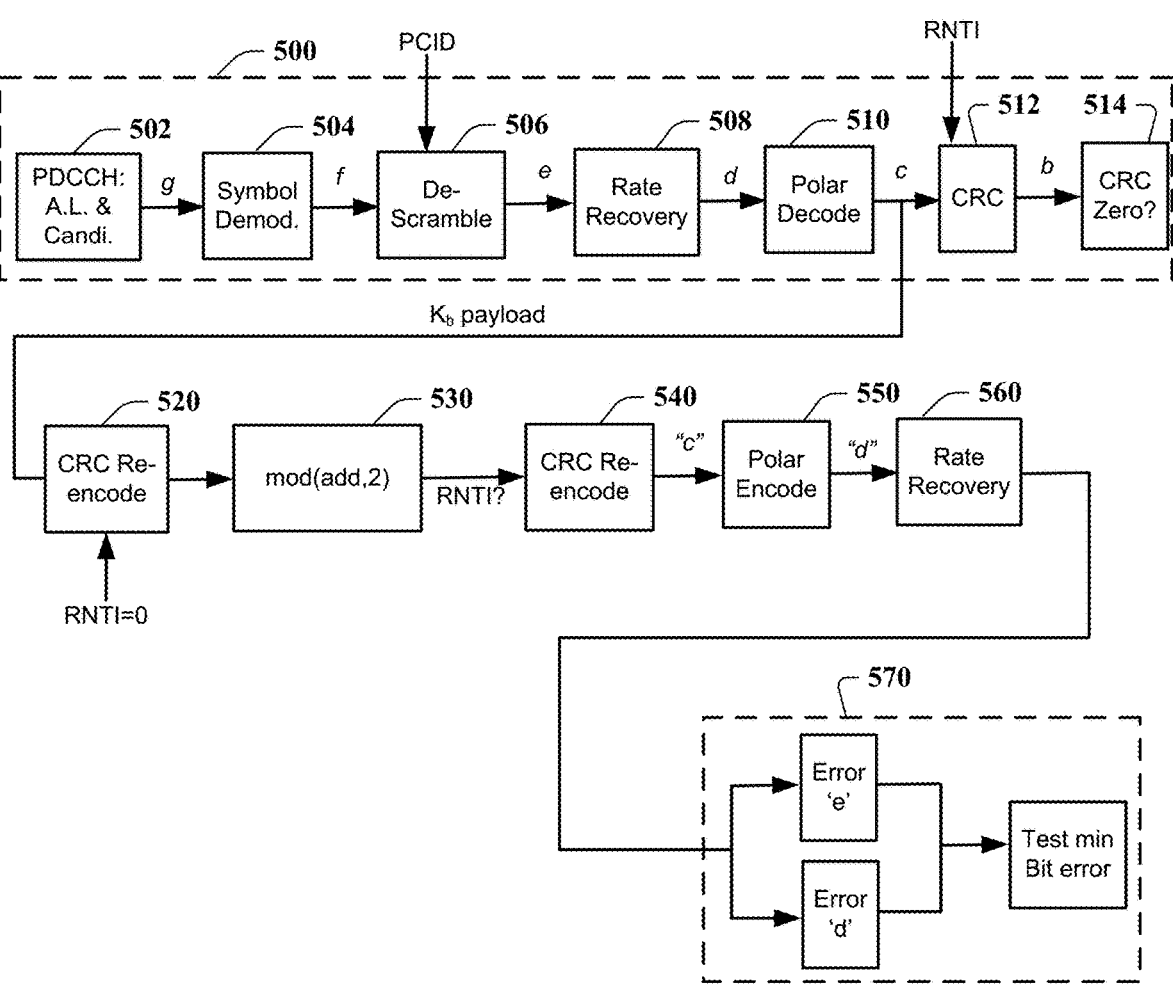
Figure 6:
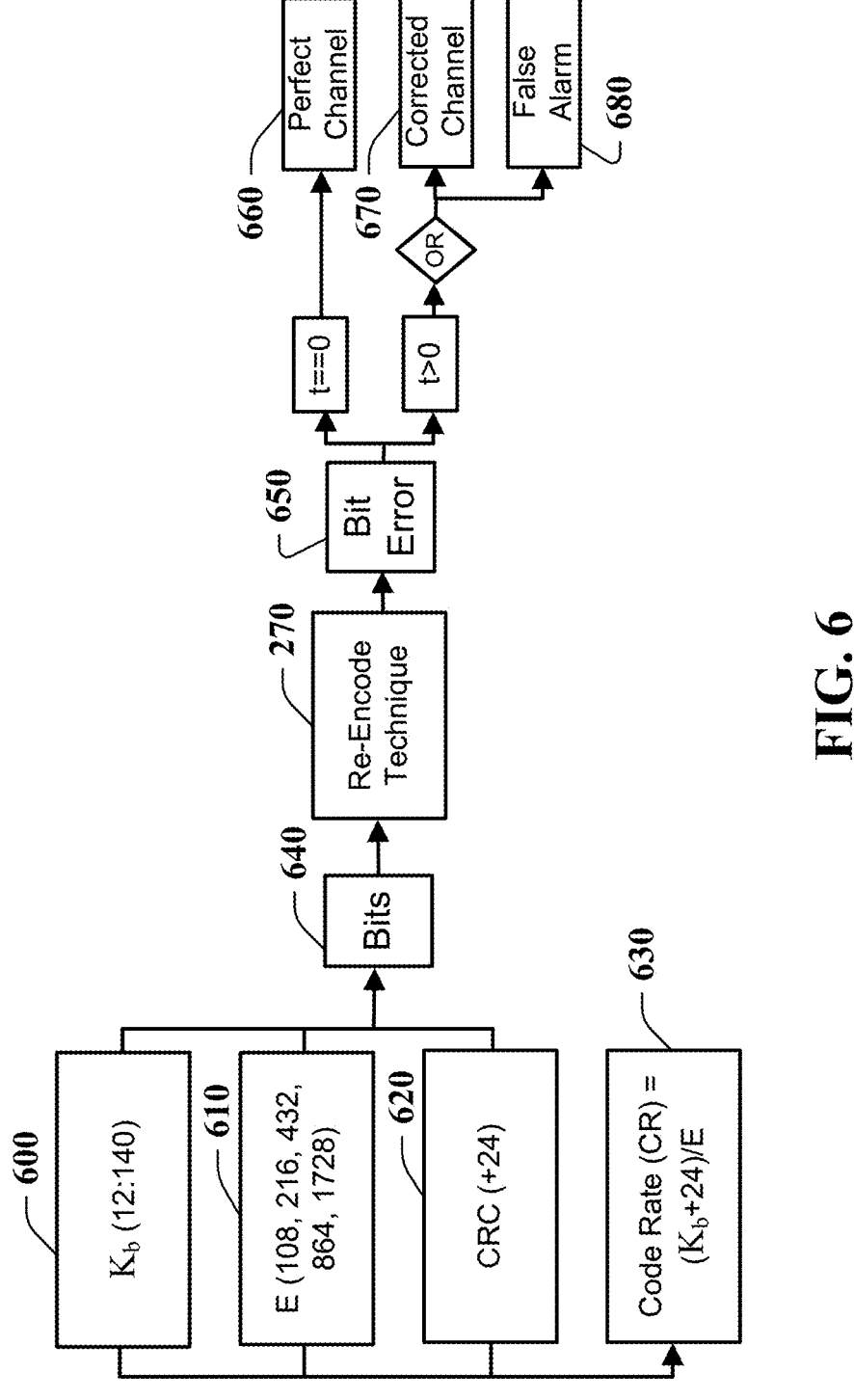
Figure 7:
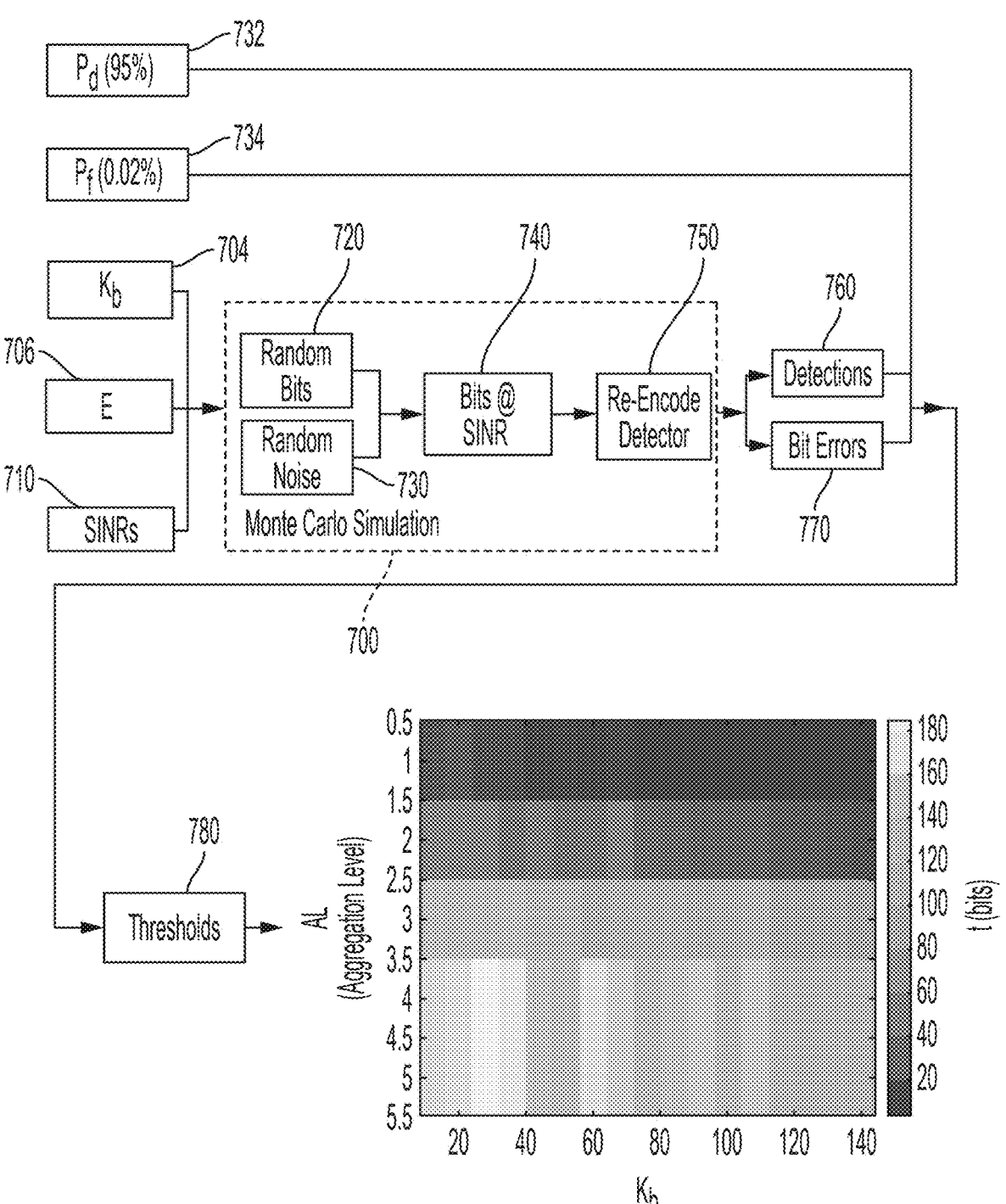
Figure 8:
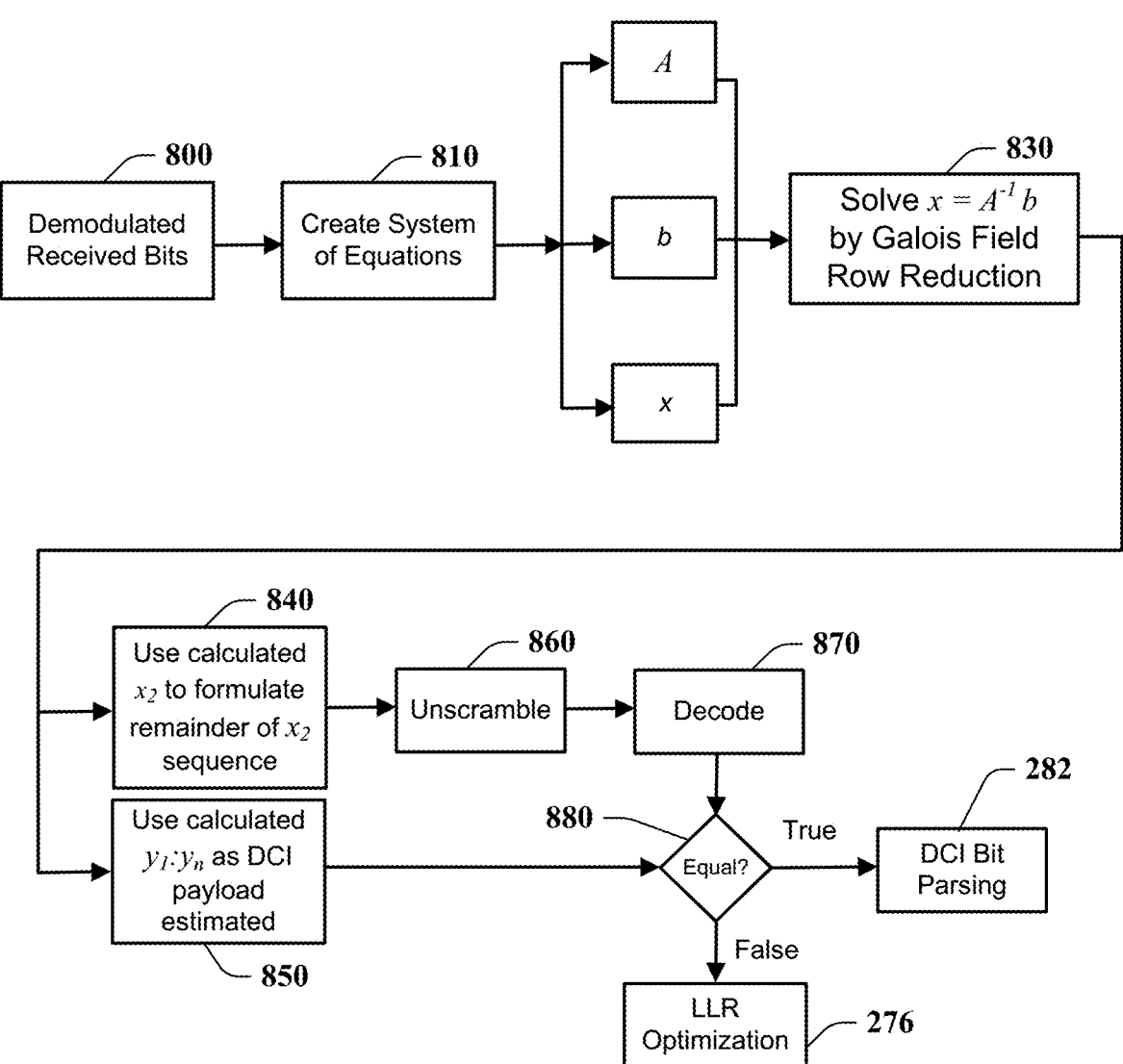
Figure 9:
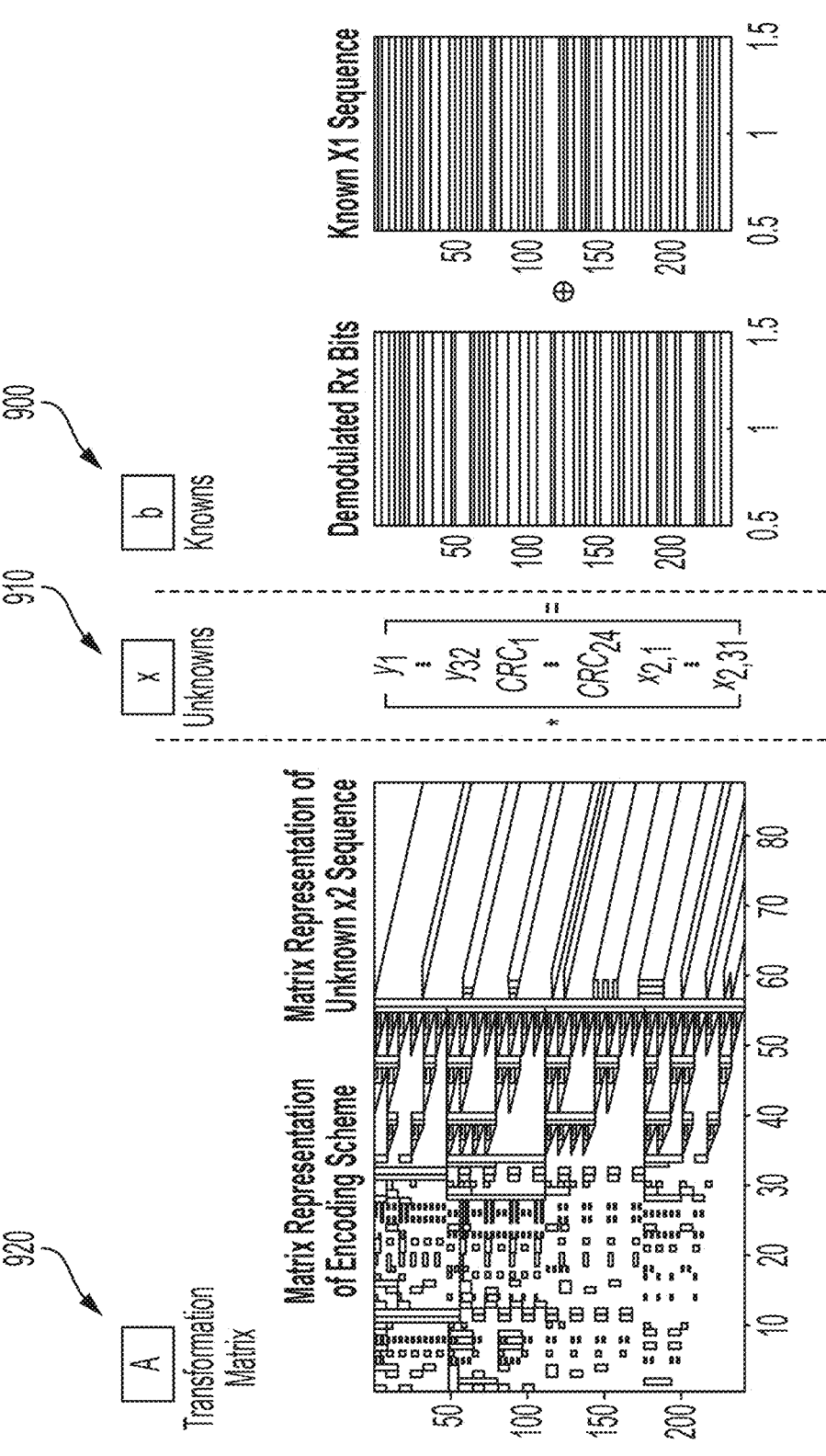
Figure 10:
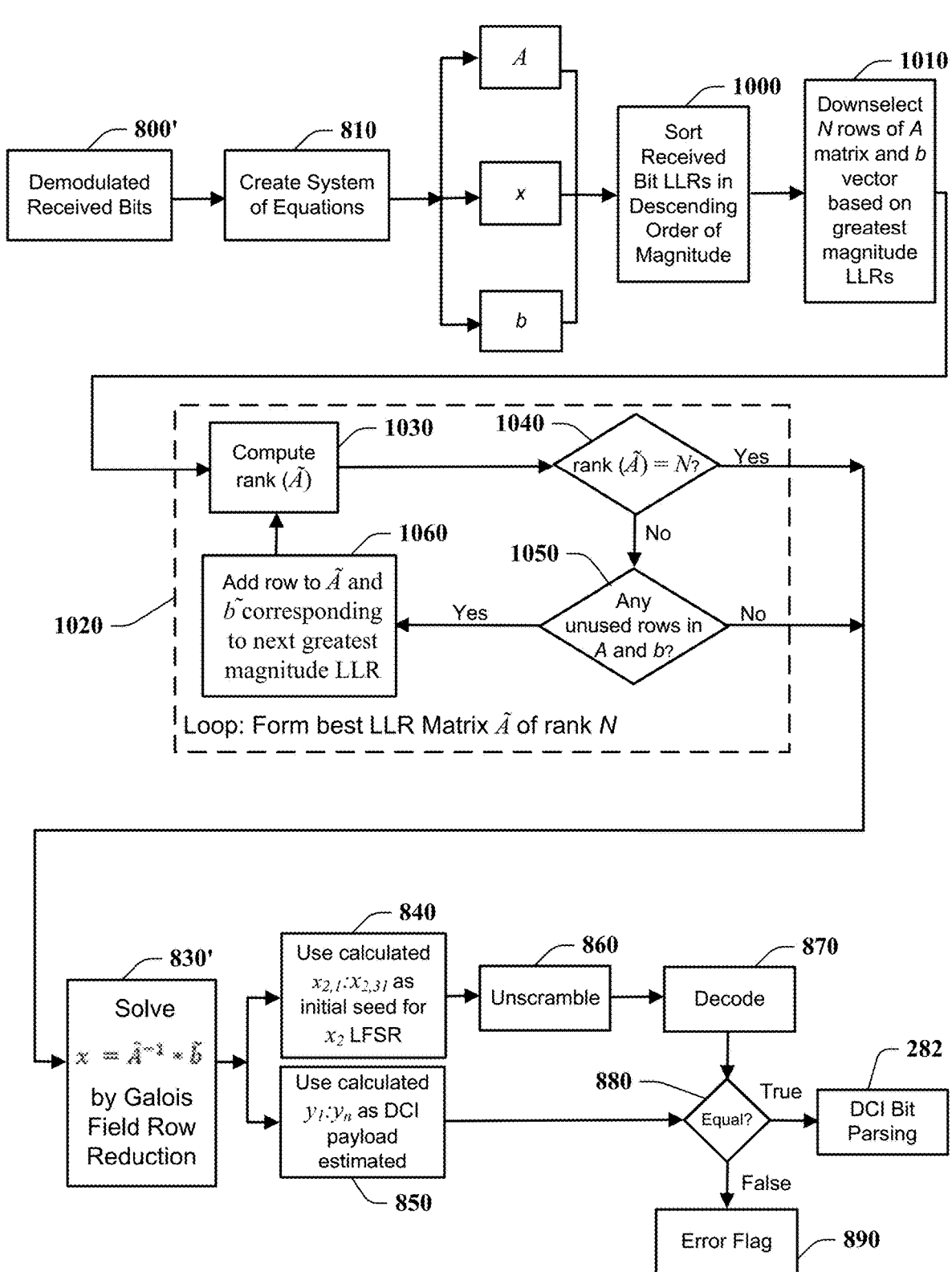
Figure 11:
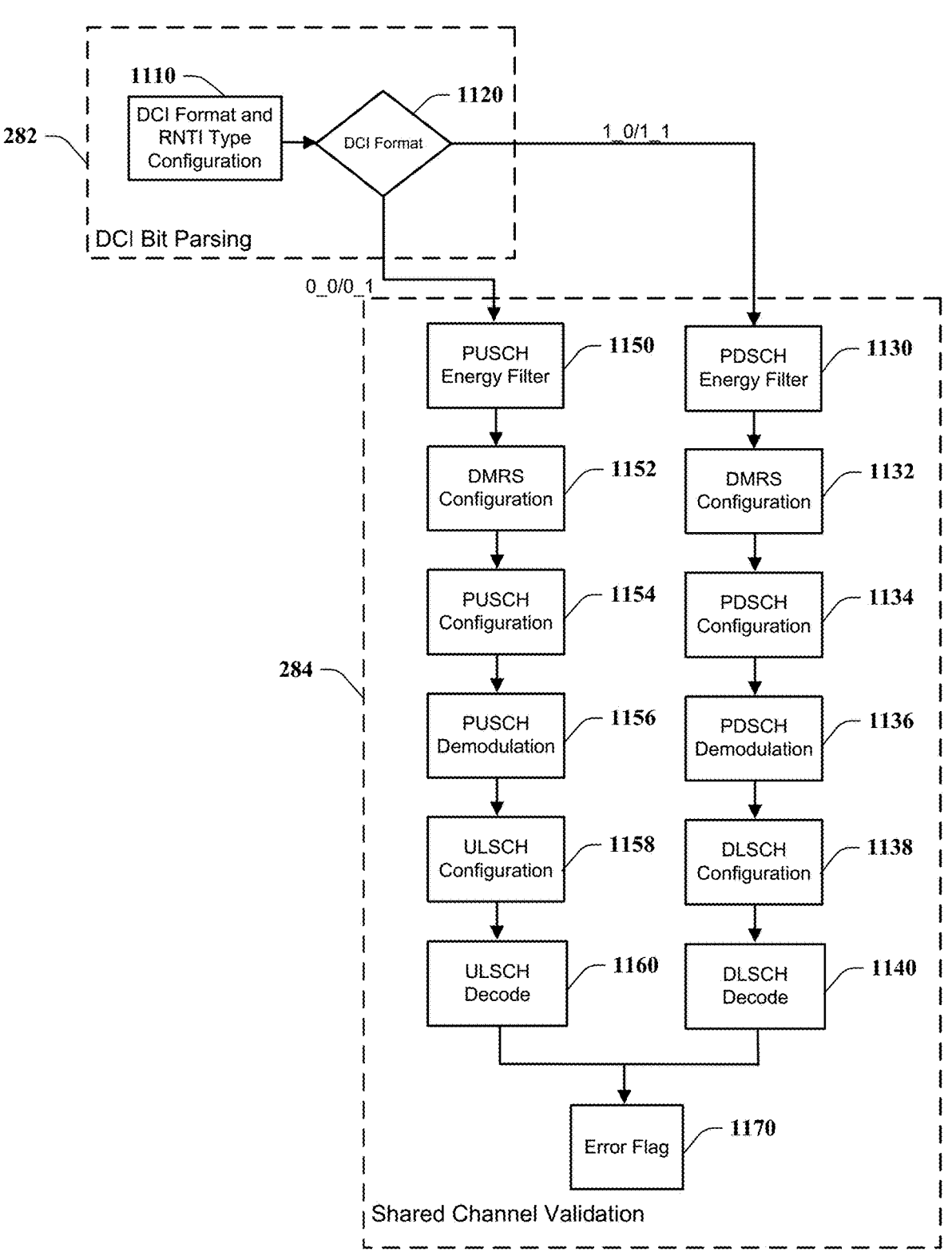
Figure 12:
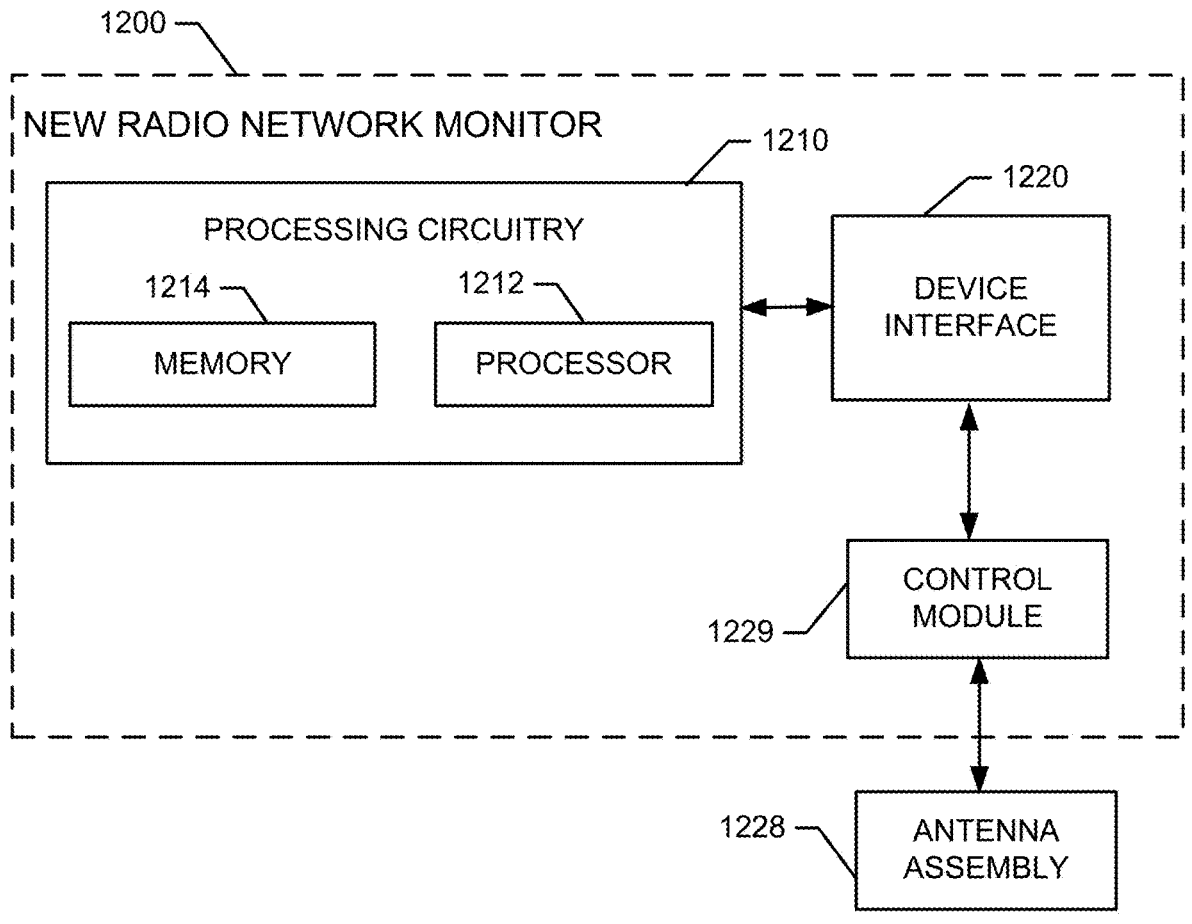

Having thus described some non-limiting, example embodiments of the invention in general terms, reference will now be made to the accompanying drawings, which are not necessarily drawn to scale, and wherein:

FIG. 1 illustrates a conventional process for passive network monitoring;

FIG. 2 illustrates a block diagram of operations associated with passive network monitoring in accordance with an example embodiment;

FIG. 3 illustrates a block diagram of general operations performed to perform a beam search and detection for noise estimation in accordance with an example embodiment;

FIG. 4 illustrates a block diagram for control channel detection in accordance with an example embodiment;

FIG. 5 illustrates a process for employing a re-encoding technique in connection with control channel decoding in accordance with an example embodiment;

FIG. 6 illustrates a block diagram of inputs and outputs associated with the re-encoding technique in accordance with an example embodiment;

FIG. 7 illustrates a block diagram showing sup-operations associated with Monte Carlo optimization in accordance with an example embodiment;

FIG. 8 illustrates a block diagram for employment of a system of equations to implement a blind scrambling seed recovery technique in accordance with an example embodiment;

FIG. 9 illustrates plots showing examples of constituent parts of the system of equations employed in FIG. 8 in accordance with an example embodiment;

FIG. 10 illustrates a block diagram of log-likelihood ratio optimization in accordance with an example embodiment;

FIG. 11 illustrates a block diagram of downlink control information recovery sub-operations in accordance with an example embodiment;

FIG. 12 illustrates a block diagram of a network monitor for determining control and scheduling information of a network via an out-of-network monitor according to an example embodiment; and FIG. 13 illustrates a block diagram of a method for determining control and scheduling information of a network via an out-of-network monitor according to an example embodiment.

DETAILED DESCRIPTION

Some non-limiting example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide a system, architectures and/or methods for improved network communication and performance. In this regard, some example embodiments may provide techniques and algorithms for passive network monitoring of 5G cellular networks over the radio interface to "blindly" detect and recover control information. Specifically, example embodiments enable passively monitoring the 5G NR physical downlink control channel (NR PDCCH) transmissions from nearby base stations to recover downlink control information (DCI) transmitted within the local 5G radio access network. This process includes novel techniques for the detection and descrambling of 5G downlink control channels (i.e., NR PDCCH) and recovery and validation of DCI. Ultimately, the output of the process is physical layer control information, which includes downlink and uplink scheduling information, user-specific resource allocations, temporary user identifiers (i.e. RNTI), and other low-level radio control information. This information is useful for a variety of applications.

An interesting and unique aspect of example embodiments is that the whole process is done "blindly," in the sense that example embodiments monitor the network passively using only information that can be observed over the radio interface by an out-of-network monitor. Thus, there is no requirement for knowledge of information that is configured by higher-layer protocols and conveyed to users with an active network connection. The fact that example embodiments enable monitoring the 5G NR control information blindly provides a distinction from the way an ordinary user device within the network would receive control information.

FIG. 1 illustrates a typical solution for passive monitoring of 4G LTE networks. In this regard, at operation 100, a radio frequency (RF) waveform may be received and cell search and Master Information Block (MIB) recovery may then be performed at operation 110. At operation 120, a PDCCH decoding operation may be performed, which includes a re-encoding technique 130 based on the original PDCCH configuration 140. The decoding performed at operation 120 may then result in DCI bit parsing at operation 150 and a resultant obtaining of control and scheduling information may be accomplished thereafter at operation 160.

A characteristic of 4G LTE was that the DCI was only scrambled by the physical cell identity (PCID), which is relatively easy to obtain with passive, out-of-network synchronization. 5G NR complicates the 4G LTE process, as noted above, by adding additional security that makes blind determination of the information associated with operation 160 above very difficult. In this regard, the DCI in 5G NR is scrambled by RNTI and a high-layer parameter called a scrambling identity. Both the RNTI and the scrambling identity are generally not obtainable with out-of-network detection. Nevertheless, example embodiments define an overall process that is shown in FIG. 2, and that process is capable of overcoming the obstacles noted above, which have been inserted into the 5G NR system relative to prior 4G LTE processes. Example embodiments may therefore define a resource analyzer for variable ecosystem network (RAVEN).

Turning to FIG. 2, operation 200 is similar to operation 100 above in that the original RF waveform is received. Notably, the RF waveform is received blindly in that no in-network information is known and thus, the RF waveform is received passively using only information that can be observed over the radio interface by an out-of-network monitor. At operation 210, cell search and MIB recovery may be performed similar to operation 110 above. In this regard, operation 210 may essentially be a normal process that a user device goes through to synchronize to a base station. Cell search is the procedure by which a user device acquires time and frequency synchronization with a cell and detects the physical cell identity (PCID) of that cell as described at 3GPP Technical Specification 38.300, which is incorporated herein by reference. In 5G NR, this is done by detecting a synchronization signal block (SSB), which includes the physical synchronization signal (PSS), a secondary synchronization signal (SSS), and a physical broadcast channel (PBCH). The MIB is recovered by decoding the PBCH. The MIB carries information that is essential to demodulate the downlink control channel within a cell. However, due to the additional security associated with 5G NR, that is where the processes of FIGS. 1 and 2 begin to diverge. In this regard, various preliminary processing techniques must be employed before PDCCH decoding may be undertaken. Thus, for example, an operation 220, e.g., a signal-to-interference-plus-noise ratio (SINR) estimation 220, may be performed, which may include an operation 222, e.g., a noise estimate 222. Operations 220 and 222 will be described in greater detail below in reference to FIG. 3.

After noise estimation, system information block (SIB) decoding may be accomplished at operation 230 and control channel detection may be accomplished at operation 240. PDCCH decoding of operation 250 may then be performed based on PDCCH configuration 260 via various sub-operations that are shown in FIG. 2. In this regard, for example, a re-encoding technique 270 may be employed, which may further involve an optimization technique 272. The re-encoding technique 270 may be tested for success and, if unsuccessful, a scrambling seed technique 274 may be employed, which may further include a log-likelihood ratio (LRR) optimization technique 276. After a successful re-encoding technique 270, or after the scrambling seed technique 274, the process may continue to DCI recovery 280. DCI recovery 280 may further include sub-operations including DCI bit parsing 282 and shared channel validation 284. Finally, at operation 290, control and scheduling information may be determined, and the passive network monitoring may be conducted thereafter since the necessary information (i.e., the RNTI and the scrambling identity) have been obtained and may thereafter be used as needed.

The various operations that are shown in FIG. 2 will now be described in greater detail below in reference to FIGS. 3-11. SINR estimation 220 generally operates to ensure that the full algorithm (i.e., remaining operations 230 to 290) is only allowed to run on waveforms with high enough signal quality. Thus, the switch shown after SINR estimation 220 may be understood to be effectively closed when the waveform detection and efforts of operations 200 and 210 generate a signal with sufficient SINR to warrant SIB decoding.

To create the most optimized SINR, estimation techniques may be employed that provide a good SINR estimate. The SINR estimate uses different possible signals, noise estimates, and phase corrections. The most successful SINR estimate in this context, called the C-Method, combines equalization phase correction, an RSRC signal, and an LS estimate using all known signals in the SSB. The C-Method can measure down to −15 dB whereas a standard SINR algorithm can estimate down to −5 dB. The known minimal SINR performance requirement of energy detections, the re-encode technique, and the scrambling seed technique can be used with the SINR estimator to prevent wasting resources on poor-quality signals, create thresholds, and sort out false positives.

Turning now to optimization of SINR and the related measurement statistics, it may be assumed that synchronization has been achieved to align to the SSB and that Y and X represent known sequences after demodulation in the frequency domain. The typical calculation of RSRP is done by finding the resource element power with only the received sequence using equation (1) below:

$$rsrp = \frac{1}{N}\sum_{i=0}^{N-1} Y \times Y^*, \tag{1}$$

where N is the number of resource elements in the sequence length. Measurement statistics like RSRP are capitalized to designate dB or dBm or lowercase like rsrp to designate linear scale. It may be possible to leverage the known information X with a correlation which is referred to as the reference signal receive correlation power (RSRC). RSRC gives element power using the cross-correlation of known and received signals by equation (2) below:

$$rsrc = \left|\frac{1}{N}\sum_{i=0}^{N-1} Y \times X^*\right|^2. \tag{2}$$

RSRC should produce more sensitive estimations because of the advantage of using a matched filter. Average symbol power or RSSI can be found using equation (3) below:

$$rssi = \frac{1}{S}\sum_{j=0}^{S-1}\left(\sum_{i=0}^{\Theta-1}|Q^2|\right), \tag{3}$$

where Q is the sequence of resource elements, $\Theta$ is the number of resource elements, and S is the number of symbols to average across. The RSRQ metric can use either rsrp or rsrc. In some examples, rsrq may be defined with rsrc, which using equation (4) below:

$$rsrq = \frac{rsrc \times N_{RB}}{rssi}. \tag{4}$$

After all measurement statistics have been described, it becomes possible to look at varying SINR methods designated with key letters such as "Q" for RSRQ, "L" for LS channel estimate, "P" for power, and "C" for correlation. In the Qmethod, RSRQ is related to SINR but depends on network load as seen by equation (5):

$$Q = \sin r = \frac{U}{\frac{1}{12 \times rsrq_c} - U}, \quad (5)$$

where network load (U) for an SSB is one as every carrier is populated. The LS estimate of channel H can be found by equation (6):

$$\tilde{H} = \frac{Y}{X} = H + N, \quad (6)$$

where the channel estimation $\tilde{H}$ can be de-noised by averaging using a smoothing window and interpolation $\tilde{H}_{AVG}$. The window size is to be optimized during simulation and testing. The noise and interference estimation can be found from their difference by equation (7):

$$\tilde{N} = \tilde{H} - \tilde{H}_{AVG}. \quad (7)$$

The L-Method uses the LS estimate for the signal component as shown by equation (8) below with:

$$L = \sin r = \frac{\tilde{H}}{\tilde{N}}. \quad (8)$$

The P-Method uses noise estimate from the LS estimate and rsrp from above as shown in equation (9) with:

$$P = \sin r = \frac{rsrp}{\tilde{N}}. \quad (9)$$

The C-Method uses noise from the LS estimate and the rsrc, specified above, using:

$$C = \sin r = \frac{rsrc}{\tilde{N}}, \quad$$

which defines the C-Method. This provides four ways to measure SINR with the Q, L, P, and C methods. However, the C-method may be preferred in some cases.

Each of the methods described above (i.e., the Q, L, P, and C methods) can use different combinations of reference signals for varying performance. In some cases, three methods of phase correction may be used with the Q and C-methods to account for phase noise and error, namely subset, differential, and equalization, which is recommended for the C-method. Each phase mitigation corrects the signal power under interference, but negatively affects the sensitivity of the SINR estimate.

FIG. 3 illustrates a block diagram of various sub-operations that may be included within operations 220 and 222 of FIG. 2. In this regard, the beam detection may follow beam search activities at operation 300, which may include convention beam and/or cell search operations involving integer carrier frequency offset (IFO), fractional frequency offset (FFO), physical-layer cell identity (PCID) detection for SSS, identifying the beam index, channel equalization activities, master information recovery, control channel, and system information related operations. Beam detection may initially involve SSB sequence number determination based on a bitmap at operation 310. Thereafter, at operation 320, a reference signal may be determined. The reference signal determination may include any one of demodulation reference signals (DMRS), SSS, PSS, MIB, etc. Moreover, using combinations of multiple reference signals may be advantageous in some cases in order to increase sensitivity. Thereafter, at operation 330, phase correction may be employed. Phase correction may include the differential method, the subset method or the equalization method. In an example embodiment, the equalization method may be used in connection with combining reference signals for improved performance.

At operation 340, signal estimates may be obtained using H estimates, RSRP, or RSRC, for example. Noise estimation may then be accomplished at operation 350 (which corresponds to operation 222 of FIG. 2) using, for example, LS estimates, or RSSI. At operation 360, SINR may be estimated via any of the Q, L, P or C-methods. In some embodiments, superior performance may be achieved by combining RSRC, LS estimates and the C-method for signal estimation, noise estimation and SINR estimation when coupled with equalization for phase correction along with a combination of reference signals.

The SINR estimation effectively acts as an on/off toggle for continued processing that is based on signal quality. Thus, as noted above, if the estimated SINR is high enough to warrant further processing, additional system broadcast information is decoded from the system information block 1 (SIB1) at operation 230. If the estimated SINR is too low, then processing may be suspended and system resources may not be wasted. When sufficient signal strength is available, SIB decoding may be conducted. SIB decoding is part of the normal process already familiar in 4G LTE, through which a user device goes to synchronize to a base station via conventional means. Scheduling information for SIB1 is transmitted from the base station using the downlink control channel (PDCCH) on core resources set (CORE-SET) 0, and the SIB1 itself is carried on the 5G NR physical downlink shared channel (PDSCH).

FIG. 4 illustrates sub-processes associated with control channel detection of operation 240 in more detail. In this regard, after "SIB1 Decode" is completed at operation 230, control channel detection may be employed at operation 240 to get the position (time-frequency) and size (number of resource blocks and symbols) of the CORESET within the downlink orthogonal frequency-division multiple access (OFDMA) grid, determine the physical downlink control channel (PDCCH) configuration, and identify the corresponding resource element (RE) indices for subsequent PDCCH decoding. Notably, achieving these goals of operation 240 is harder in 5G NR than it was in 4G LTE because the scheduling and configuration of the control channel is much more flexible in 5G NR than it was in 4G LTE. Consequently, the time-frequency scheduling of the CORE-SET in 5G NR is not known to an out-of-network monitor in advance. The problem is compounded for an out-of-network monitor by the fact that it is necessary to detect all the CORESETs and recover all the control channels to obtain global knowledge of the DCI, which is generally a more demanding requirement than for a standard user within the network. This problem is non-trivial for an out-of-network monitor and has not been fully addressed by prior solutions.

In this regard, as shown in FIG. 4, the MIB, SIB1, carrier information, and settings 400 are provided from operation 230 above along with the received waveform at operation 402. Operation 402 further includes provision of MIB, carrier information, and settings that have been determined or are received to this point in the process as part of initial acquisition and synchronization. Thereafter, the search-space is set at operation 404. The search-space may have two different types, one common, and one that is user equipment (UE) specific. For the UE specific path, an alignment to the carrier is performed at operation 406, whereas for the common path, the alignment is not performed. Energy detection is performed at operation 408.

The energy detection at operation 408 is used to determine the active resource blocks at operation 410. Parameters from the MIB and SIB1 such as the physical cell ID (PCID), subcarrier spacing (SCS), and bandwidth (BW) are used to further configure the carrier. From the active resource blocks, the candidate CORESETs are found at operation 416 through intelligent filtering at operation 414 of the active RBs based on waveform features of the NR CORESET as defined in 3GPP TS 38.211. These operations are important because there are many options for where the control channel can be scheduled (time-frequency position in the OFDMA grid) and finding it is important to getting the correct resource elements (REs) at operation 420 and recovering the DCI.

Intelligent filtering based on waveform features enables elimination of signals and channels that were detected by the energy detector at operation 408, but do not meet the rules defined for an NR CORESET. This approach speeds up the processing time of an out-of-network monitor considerably. Speed improvement is important for practical applications because, even after filtering, there are many possible ways the CORESET can be mapped to time-frequency radio resources, which leads to a large list of candidate CORE-SETs to search through for a correct PDCCH decode Further details on intelligent filtering of the active resource blocks that occurs during operation 414 based on waveform features are described below. In this regard, for example, the active resource blocks are filtered out if the resource blocks do not meet the scheduling requirements for the NR CORESET in terms of REs and RBs as defined in 3GPP TS 38.211. Additionally, getting the position of the CORESET (time-frequency) requires taking into consideration the properties of the control channel (search-space and CORESET) and how these properties can be configured. For the search-space, these are duration (in symbols), number of candidates, etc. For the CORESET, these are CCEREGMapping, REGBundleSize, InterleaverSize, ShiftIndex, etc. If the control channel and its properties (search-space and CORESET) are correctly identified, the CORESET can be correctly detected using the processes described herein, and re-encoding may thereafter be commenced via the re-encoding technique 270.

FIG. 5 illustrates the sub-processes associated with the re-encoding technique 270 of the PDCCH decoding of operation 250. After the PDCCH has been found via the control channel detection of operation 240, a re-encoding technique may be used to capture common control channel information, as opposed to a user-specific control channel, at operation 270. As will be discussed in greater detail below, the scrambling seed technique 274 will be employed for any failed re-encodes to capture user-specific control channel information.

Common control channels are encoded with only the PCID so they can be found with re-encoding like in 4G LTE. The re-encode technique 500 follows along with traditional PDCCH decoding until the cyclic redundancy check (CRC), and will therefore not be described in detail. However, as can be seen in FIG. 5, operation 500 may include receipt of the PDCCH at operation 502, symbol demodulation 504, descrambling 506 (e.g., via the PCID), rate recovery 508, polar decoding 510, CRC 512 (via the RNTI), and determining whether the CRC is zero 514. For the re-encoding technique 270 of example embodiments, operations 512 and 514 must necessarily be skipped and substituted with a different set of operations. In this regard, instead of CRC checking with the user equipment's RNTI to confirm the control channel decoded (CRC=0), a different approach must be taken since RNTI is not yet known. Accordingly, the re-encoding technique 270 assumes that the channel decoded re-encodes the CRC check with a RNTI of zero at operation 520 and adds the checksum together at operation 530 to create a RNTI guess (shown as "RNTI?" in FIG. 5). From there, the entire control channel information is re-encoded at operation 540 and the bits are compared after re-encoding the polar code at operation 550. Rate recovery may then be performed at operation 560 and bit error consideration may then be performed at operation 570. Zero-bit errors have a high probability of a true positive. However, bit errors could just arise from correcting the channel and the RNTI and message could still be recovered. Without the CRC check, a histogram or Monte Carlo thresholding as described below could help gain confidence when correcting the control channel, and may therefore act as the optimization technique 272.

Thus, in some cases, the re-encoding technique may be understood to include operations that effectively attempt to decode encoded bits of the control information from the control channel in the common search space via an assumed RNTI (e.g., assuming RNTI=0), then re-encode the control information using a guessed RNTI (e.g., a guess of RNTI) to define re-encoded bits. Thereafter, a comparison is made between the control channel encoded with the assumed RNTI and the encoded bits to determine if the re-encoding is successful based on a number of bit errors.

FIGS. 6 and 7 illustrate sub-processes associated with the optimization technique 272. In some embodiments, the optimization technique 272 may be a Monte Carlo optimization. FIG. 6 illustrates how the re-encode technique 270 may be tested over a range of potential message bit lengths $(K_b)$ and bit lengths with bits and redundancy (E) for each aggregation level (AL) to search for a low number of bit differences or a detection. In this regard, a range of bit lengths 600 and series of bit lengths with bits and redundancy 610 along with consideration of CRC 620 and a code rate 630 determined in dependence on $(K_b)$ and (E) may be used to determine bits 640 to provide to the re-encode technique 270. Bit error evaluation 650 may then be performed where no errors correspond to a perfect channel 660, and the number of errors is otherwise indicative of either a corrected channel 670 or a false alarm 680.

To help determine how many bits are acceptable for a given control channel information, a Monte Carlo simulation 700 can show typical bit differences for a given SINR 710, as shown in FIG. 7. As shown in FIG. 7, the Monte Carlo simulation 700 (or algorithm) may run a test for a given $K_b$ 704 and E 706 with randomized bits 720 and randomized noise 730 defining bits 740 at a given SINR via re-encode detector 750 and an evaluation of the detections 760 and bit errors 770 generated by the Monte Carlo simulation 700 to find what bit threshold 780 could be used to create a probability of detection ($P_d$) 732 (in this case 95%) and probability of false alarm ($P_f$) 734 (in this case 0.02%). The threshold 780 typically goes higher for a larger number of redundancy bits or a lower coding rate which is not a concern as $K_b$ and E are quantifiable while running the technique. This optimization helps set a higher bit difference threshold for the re-encoding technique while preventing false alarms. At a high level, the Monte Carlo simulation 700 indicates what number of bits can typically be corrected, which allows for setting a higher bit difference threshold.

If re-encoding is successful, flow may proceed to DCI recovery 280 as shown in FIG. 2. However, if re-encoding via the re-encoding technique 270 is not successful, then the scrambling seed technique 274 (which may also be referred to as a "blind" scrambling seed recovery technique) may be employed prior to DCI recovery 280. FIGS. 8 and 9 illustrate sub-processes associated with the scrambling seed technique 274. The scrambling seed technique 274 is an algorithm that is designed to recover the encoded and scrambled DCI payload without prior knowledge of the initial value (seed) used to scramble the data. A majority of the 4G control channel (LTE PDCCH) processing chain remains the same for the 5G control channel (NR PDCCH), with the important exception that in 5G the scrambling sequence can be generated using the RNTI of the UE and a higher-layer parameter called the scrambling identity for the initial value. The RNTI and the scrambling identity are not generally known to an out-of-network monitor and are non-trivial to obtain, making the DCI unrecoverable when it is scrambled in this way. The current state-of-the-art for 5G NR passive network monitoring fails to solve this descrambling problem, which did not exist in 4G LTE. Example embodiments solve this problem by using knowledge of the 5G control channel (NR PDCCH) encoding chain and the scrambling sequence structure to formulate an algorithm to recover the unknown DCI payload, CRC, and scrambling initial value (i.e., scrambling sequence) based on a system of equations.

The scrambling seed technique 274 begins with a demodulated bit stream 800 that will (in reference to FIG. 8) be referred to as the received bits. The received bits are related to the DCI payload in that the received bits are the DCI payload plus a CRC as it is transmitted over the channel (i.e., encoded, rate-matched, and scrambled). The received bits are masked with a pseudorandom noise sequence called a length-31 Gold sequence, which is explicitly defined in the 3GPP specification and formulated by the combination of two maximum length sequences [expressed as linear feedback shift registers (LFSRs)], one with a constant and predefined initial seed and the other with a unique and variable initial seed. Solving for the latter, unknown initial seed is a primary end goal of this technique. The essence of the scrambling seed technique is to set up a system of linear equations 810 that can be solved through matrix row reduction techniques.

The first step in this process is to collect the known information, which in this case is the received bits and the known portion of the Gold sequence (the known portion of the Gold sequence is defined as $x_1$). These two pieces are combined together (e.g., via an XOR function), and now the received bits are only masked with the unknown portion of the Gold sequence (the unknown portion of the Gold sequence is defined as $x_2$). The resulting vector of known information may then be defined as vector b, an example of which is shown in FIG. 9 in block 900.

The next step is to collect the unknowns in a single vector. In this case, the unknowns are considered to be the original bits of the DCI payload, the CRC attached by the transmitter, and the first 31 bits of the $x_2$ portion of the Gold sequence (these are related to the initial seed but are not exactly the same). The DCI payload bits are labeled as $y_1{:}y_n$ (and n here refers to the number of bits in the DCI payload). The unknowns are formed in a single vector x as shown in block 910 of FIG. 9, with the DCI payload bits first, then the CRC, then the $x_2$ sequence appended at the end.

The next, and in one embodiment final, step in setting up the system of equations 810 is to construct a matrix A that relates the unknown vector x to the known vector b. The matrix A contains an expression of how the DCI payload relates to the received bits.

The left-hand portion of the A matrix (shown in block 920 in FIG. 9) is constructed by passing the identity matrix through each the Polar Encoder and Rate Matching blocks that are defined in the 3GPP standard and implemented in MATLAB. The right-hand portion of the A matrix is constructed through both an identity matrix and then recursion properties of a maximum length (Gold is a specific type) sequence to describe future sequence values in terms of the first 31 bits of the sequence. Once the A matrix is constructed, it is possible to solve $x = A^{-1} {*} b$ through Galois Field row reduction at operation 830 and what results is the DCI payload, the CRC attached by the transmitter, and the first 31 terms of the $x_2$ sequence. It is possible to solve for the RNTI itself (the initial seed) through a rewind of the first 31 terms of the $x_2$ sequence, but it is not necessary in order to have decoded the payload successfully.

As shown at operation 840, the calculated $x_{2,1}{:}x_{2,31}$ may thereafter be used to construct the remainder of the $x_2$ sequence and an attempt may be made to unscramble 860 and decode 870 the sequence. As shown at operation 850, the calculated $y_1{:}y_n$ may be used as an estimated DCI payload. Results from operations 840 and 850 may then be compared to see if they are equal at operation 880. If equal, flow may transition to DCI bit parsing at operation 282 since the equality indicates that the estimated payload matches the unscrambled and decoded payload using the solution of operation 830. If not equal, an error flag may be set at operation 890.

A possible and operational issue with the technique described is its reliance on quality SNR in the received, demodulated data, i.e. if there is a single bit error in the received data, the algorithm will fail. In an effort to circumvent this weakness, the soft-bit information in the form of ranked log-likelihood ratios (LLRs) from the demodulated signal may be used in an effort to improve the performance of the technique.

FIG. 10 illustrates an LLR optimization technique 276 according to an example embodiment. As noted above, the blind scrambling seed technique 274 described above is not robust against bit errors caused by the communication channel. This problem arises due to the fact that descrambling at the receiver occurs prior to forward error control (FEC) decoding, which is used to correct these bit errors. It is highly likely that bit errors will occur in wireless communications channels due to phenomena such as noise, interference, fading, etc. Bit errors corrupt the system of equations used in the scrambling seed technique, resulting in an incorrect solution. Without some sort of mitigation, a very high signal to noise ratio (SNR) is required for the scrambling seed technique to work effectively.

LLR optimization technique 276 may be used to address this problem. In particular, a possible solution may be to employ an algorithm that may be referred to as the "best LLR algorithm." The best LLR algorithm is an improvement to the scrambling seed technique and therefore FIG. 10 builds off of FIG. 8 to illustrate modifications made to the scrambling seed technique 274 to employ the best LLR algorithm. To solve for N unknowns (where N is the length of x), N linearly independent equations may be employed in the system of equations defined by Ax=b. In most cases, the number of received bits (i.e., length of b) and the corresponding number of rows in the A matrix will be greater than N due to the redundancy introduced by the FEC encoder at the transmitter. The basic concept of the best LLR algorithm is to leverage this redundancy to remove rows of the vector b and the matrix A that correspond to received bits with the highest probability of being received in error prior to solving the system of equations. This optimization reduces the probability of having a bit error in the final system of equations and allows the scrambling seed technique 274 to operate reliably at lower SNR. Simulation analysis shows that the best LLR algorithm improved performance by up to 10 dB SNR, depending on the code rate of the control channel.

Referring now to FIG. 10, operation proceeds as in the seed scrambling technique 274 of FIG. 8 except that the demodulated received bits 800 of FIG. 8 may include soft-bits obtained from the demodulator that are expressed mathematically as log-likelihood ratios (LLRs) or approximate LLRs. To account for this change, the demodulated received bits are labeled 800 in FIG. 10. An LLR is the logarithm of the ratio of the probability of a 0 bit being transmitted over the probability of a 1 bit being transmitted for a given received signal. The sign of the LLR indicates whether the bit is demodulated as a 1 or a 0, and the magnitude of the LLR indicates the confidence that the bit was demodulated correctly, with larger magnitudes representing greater probability of correct demodulation. In the best LLR algorithm, after forming A, x, and b, the received bits are sorted in descending order of the magnitude of the LLRs at operation 1000. The corresponding rows of the b vector and the A matrix are reordered such that the system of equations is equivalent to the original. Next, the rows of the b vector and the A matrix are down-selected to the rows corresponding to the N selected received bits corresponding to the greatest magnitude LLRs at operation 1010. The truncated vector and matrix may be referred to by the variables $\tilde{b}$ and $\tilde{A}$, respectively. After operation 1010, a system of N equations and N unknowns is obtained, but it remains unknown as to whether the equations are linearly independent.

Accordingly, the algorithm then employs an iterative loop 1020. During the loop, the rank of the $\tilde{A}$ matrix, which is equivalent to the number of linearly independent equations, is initially calculated at operation 1030. A determination is then made at operation 1040 as to whether the rank of the $\tilde{A}$ matrix is equal to N. If the rank equals the number of unknowns N then an attempt is made to solve the equation $x=\tilde{A}^{-1}*\tilde{b}$ through Galois Field row reduction at operation 830. If the rank is less than N, then a determination is made as to whether there are any unused rows in A and b at operation 1050. If yes, an additional row is added to vector $\tilde{b}$ and matrix $\tilde{A}$ corresponding to the received bit with the next greatest magnitude at operation 1060 and flow returns to operation 1030. Iteration continues by checking the rank of the updated $\tilde{A}$ matrix and continuing to add rows, one at a time, corresponding to the received bits with the next highest magnitude LLR until the rank of $\tilde{A}$ equals N. If the rank of the full A matrix is less than N when all received bits are included, then the original scrambling seed technique cannot be improved upon using the LLR optimization. In such cases, an attempt to solve the original problem of the scrambling seed technique by using all available rows of A and b (i.e., set $\tilde{A}$=A and $\tilde{b}$=b) is performed.

FIG. 11 illustrates sub-processes associated with DCI recovery 280. As shown in FIG. 2, DCI recovery 280 can be broken down into two parts including DCI bit parsing 282 and shared channel validation 284. The DCI bit parsing 282 takes the decoded DCI bits 1110 and configures the DCI fields of the applicable DCI format(s) (0_0, 0_1, 1_0, or 1_1, etc.) and RNTI Types (C-RNTI, RA-RNTI, SI-RNTI, etc.). Parsing the DCI bits is harder in 5G NR than 4G LTE because a lot of these fields are no longer fixed and can vary in size (number of bits). So, the shared channel validation 284 is an important step to confirm that that the DCI bits have been decoded and parsed correctly. This step initially configures the appropriate physical uplink/downlink shared channel and uses the correlation of the DMRS to configure additional parameters of the shared channel. The downlink/uplink shared channels are then configured and decoded. If CRC=0, this indicates that the shared channel has been decoded correctly which further validates that the DCI bits have been decoded and parsed correctly. Thus, for example, after filtering the physical downlink shared channel (PDSCH) at operation 1130, DMRS configuration is performed at operation 1132. PDSCH configuration 1134 and PDSCH demodulation 1136 are then performed prior to downlink shared channel (DLSCH) configuration at operation 1138 and DLSCH decoding at operation 1140. Similar operations occur for the physical uplink shared channel (PUSCH). In this regard, after filtering the PUSCH at operation 1150, DMRS configuration is performed at operation 1152. PUSCH configuration 1154 and PUSCH demodulation 1156 are then performed prior to uplink shared channel (ULSCH) configuration at operation 1158 and ULSCH decoding at operation 1160. Following decoding along either path, an error flag (CRC) may be provided at operation 1170. After DCI recovery 280, no error flag (CRC==0) indicates that the control information has been recovered and parsed correctly.

FIG. 12 illustrates an example structure for a new radio network monitor 1200 of an example embodiment. In this regard, as shown in FIG. 12, the new radio network monitor 1200 may include processing circuitry 1210 configured to perform data processing, control function execution and/or other processing and management services according to an example embodiment. In some embodiments, the processing circuitry 1210 may be embodied as a chip or chip set. In other words, the processing circuitry 1210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 1210 may therefore, in some cases, be configured to implement an embodiment on a single chip or as a single "system on a chip." As such, in some cases, a chip or chipset may constitute means for performing one or more operations for providing the functionalities described herein.

In an example embodiment, the processing circuitry 1210 may include one or more instances of a processor 1212 and memory 1214 that may be in communication with or otherwise control a device interface 1220. As such, the processing circuitry 1210 may be embodied as a circuit chip (e.g., an integrated circuit chip) configured (e.g., with hardware, software or a combination of hardware and software) to perform operations described herein. However, in some embodiments, the processing circuitry 1210 may be embodied as a portion of an on-board computer. In some embodiments, the processing circuitry 1210 may communicate with various components, entities, systems and/or sensors of the new radio network monitor 1200, e.g., via the device interface 1220. Thus, for example, the processing circuitry 1210 may communicate with an antenna assembly 1228 and corresponding control module 1229 to control the frequency and/or direction at which the antenna assembly 1228 is configured to operate.

The device interface 1220 may include one or more interface mechanisms for enabling communication with other devices (e.g., modules, entities, sensors and/or other components of the new radio network monitor 1200). In some cases, the device interface 1220 may be any means such as a device or circuitry embodied in either hardware, or a combination of hardware and software that is configured to receive and/or transmit data from/to modules, entities, sensors and/or other components of the new radio network monitor 1200 that are in communication with the processing circuitry 1210. In this regard, for example, the device interface 1220 may be configured to operably couple the processing circuitry 1210 to antenna assembly 1228 and/or the control module 1229.

The processor 1212 may be embodied in a number of different ways. For example, the processor 1212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 1212 may be configured to execute instructions stored in the memory 1214 or otherwise accessible to the processor 1212. As such, whether configured by hardware or by a combination of hardware and software, the processor 1212 may represent an entity (e.g., physically embodied in circuitry—in the form of processing circuitry 1210) capable of performing operations according to example embodiments while configured accordingly. Thus, for example, when the processor 1212 is embodied as an ASIC, FPGA or the like, the processor 1212 may be specifically configured hardware for conducting the operations described herein. Alternatively, as another example, when the processor 1212 is embodied as an executor of software instructions, the instructions may specifically configure the processor 1212 to perform the operations described herein.

In an example embodiment, the processor 1212 (or the processing circuitry 1210) may be embodied as, include or otherwise control the operation of the control module 1229 based on inputs received by the processing circuitry 1210. As such, in some embodiments, the processor 1212 (or the processing circuitry 1210) may be said to cause each of the operations described in connection with the control module 1229. The processor 1212 may also control the antenna assembly 1228 to tune the antenna assembly 1228 to perform the high level operations of FIG. 2, and the sub-operations associated with each of the operations shown in FIG. 2 in relation to adjustments to be made to antenna assembly 1228 or other components of the new radio network monitor 1200 to undertake the corresponding functionalities relating to conducting network monitoring based on execution of instructions or algorithms configuring the processor 1212 (or processing circuitry 1210) accordingly.

In an exemplary embodiment, the memory 1214 may include one or more non-transitory memory devices such as, for example, volatile and/or non-volatile memory that may be either fixed or removable. The memory 1214 may be configured to store information, data, applications, instructions or the like for enabling the processing circuitry 1210 to carry out various functions in accordance with example embodiments. For example, the memory 1214 could be configured to buffer input data for processing by the processor 1212. Additionally or alternatively, the memory 1214 could be configured to store instructions for execution by the processor 1212. As yet another alternative, the memory 1214 may include one or more databases that may store a variety of data sets responsive to input sensors and components. Among the contents of the memory 1214, applications and/or instructions may be stored for execution by the processor 1212 in order to carry out the functionality associated with each respective application/instruction. In some cases, the applications may include instructions for providing inputs to control operation of the antenna assembly 1228 and/or the control module 1229 as described herein.

FIG. 13 illustrates a block diagram of one method that may be associated with an example embodiment as described above. From a technical perspective, the processing circuitry 1210 described above may be used to support some or all of the operations described in FIG. 13. As such, the platform described in FIG. 12 may be used to facilitate the implementation of several computer program and/or network communication-based interactions. As an example, FIG. 13 is a flowchart of a method and program product according to an example embodiment. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the processing circuitry 1210, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture that implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flow-chart, can be implemented by special purpose hardware-based computer systems which perform the specified functions, or combinations of special purpose hardware and computer instructions.

In this regard, a method for determining control and scheduling information of a network via an out-of-network monitor may be provided, as shown in FIG. 13. The method may include receiving an RF waveform having DCI scrambled via a scrambling identity unknown to the out-of-network monitor where the DCI provides the control and scheduling information at operation 1300. The method may further include performing a cell search to determine cell identity information for a cell via which the RF waveform is received at operation 1310 and performing a beam search and beam detection for the cell to estimate a signal quality of the RF waveform at operation 1320. In response to the signal quality being above a threshold signal quality, the method may continue with decoding scheduling information associated with the RF waveform at operation 1330 and detecting a control channel encoded with an unknown identity based on the scrambling identity and extracting resource elements of the control channel based on the scheduling information at operation 1340. The method may further include attempting to decode the control channel via a re-encoding technique that is tested for accuracy and, in response to accuracy testing not passing, via a blind scrambling seed recovery technique at operation 1350, recovering the DCI based on the re-encoding technique or the blind scrambling seed recovery technique at operation 1360, and obtaining the control and scheduling information from the DCI at operation 1370.

Thus, in accordance with an example embodiment, a new radio network monitor for determining control and scheduling information of a network from outside the may be provided. The network monitor may be an apparatus that includes processing circuitry (e.g., a processor and memory) in which the processor is configured by instructions stored in the memory to perform various programmed tasks. In an example embodiment, the processing circuitry may be configured to perform the method of FIG. 13.

In some embodiments, the method (or apparatus comprising processing circuitry configured to perform the method) may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the re-encoding technique may include attempting to decode encoded bits of common control channel information from the control channel via an assumed identity, re-encoding the common control channel information using a guessed identity to define re-encoded bits, and comparing the control channel encoded with the guessed identity to the encoded bits to determine if the re-encoding is successful based on a number of bit errors. In an example embodiment, in response to the number of bit errors being below a threshold bit error, recovering the DCI may be performed based on the re-encoding technique without the blind scrambling seed recovery technique. In some cases, the re-encoding technique may be optimized via Monte Carlo thresholding. In an example embodiment, the blind scrambling seed recovery technique may be performed in response to the number of bit errors being above the threshold bit error. In some cases, the blind scrambling seed recovery technique may include solving a system of equations to determine a set of unknown information associated with the DCI, where the system of equations includes a set of known information associated with the DCI, the set of unknown information, and a transformation matrix applied to the set of known information to obtain the set of unknown information to determine the DCI. In an example embodiment, the set of known information may include received bits and a known portion of a length-31 Gold sequence. In some cases, the system of equations may be solved via a Galois field row reduction. In an example embodiment, solving the system of equations may determine a calculated DCI payload and a seed value used to determine an unscrambled and decoded result, and the calculated DCI payload may be compared to the unscrambled and decoded result to determine the DCI. In some cases, responsive to a success of re-encode technique or scrambling seed technique in which a bit error is lower than a set threshold, DCI bit parsing is employed. In an example embodiment, responsive to no match between the calculated DCI payload and the unscrambled and decoded result, log-likelihood ratio (LLR) optimization may be employed to determine the DCI. In some cases, the LLR optimization may include sorting received bit LLRs in descending order, down-selecting N rows of the transformation matrix and the set of known information based on greatest magnitude LLRs to define an updated transformation matrix, and iteratively calculating a rank of the updated transformation matrix until the rank of the updated transformation matrix is equal to N.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method of determining control and scheduling information of a network via an out-of-network monitor, the method comprising:

passively receiving a radio frequency (RF) waveform of a radio interface, using only information that can be observed over the radio interface by the out-of-network monitor, having downlink control information (DCI) scrambled via a scrambling identity unknown to the out-of-network monitor, the DCI providing the control
and scheduling information;

performing a cell search to determine cell identity infor-
mation for a cell via which the RF waveform is
received;

performing a beam search and beam detection for the cell
to estimate a signal quality of the RF waveform;

in response to the signal quality being above a threshold
signal quality, decoding scheduling information asso-
ciated with the RF waveform;

detecting a control channel encoded with an unknown
identity based on the scrambling identity and extracting
resource elements of the control channel based on the
scheduling information;

attempting to decode the control channel via a re-encod-
ing technique that is tested for accuracy and, in
response to accuracy testing not passing, via a blind
scrambling seed recovery technique;

recovering the DCI based on the re-encoding technique or
the blind scrambling seed recovery technique; and obtaining the control and scheduling information from the
DCI.

2. The method of claim 1, wherein the re-encoding
technique comprises:

attempting to decode encoded bits of common control
channel information from the control channel via an
assumed identity;

re-encoding the common control channel information
using a guessed identity to define re-encoded bits; and comparing the control channel encoded with the guessed
identity to the encoded bits to determine if the re-
encoding is successful based on a number of bit errors.

3. The method of claim 2, wherein, in response to the
number of bit errors being below a threshold bit error,
recovering the DCI is performed based on the re-encoding
technique without the blind scrambling seed recovery tech-
nique.

4. The method of claim 3, wherein the re-encoding
technique is optimized via Monte Carlo thresholding.

5. The method of claim 1, wherein the blind scrambling
seed recovery technique is performed in response to a
number of bit errors being above a threshold bit error.

6. The method of claim 5, wherein the blind scrambling
seed recovery technique comprises solving a system of
equations to determine a set of unknown information asso-
ciated with the DCI, the system of equations including a set
of known information associated with the DCI, the set of
unknown information, and a transformation matrix applied
to the set of known information to obtain the set of unknown
information to determine the DCI.

7. The method of claim 6, wherein the set of known
information comprises received bits and a known portion of
a length-31 Gold sequence.

8. The method of claim 6, wherein the system of equations
is solved via a Galois field row reduction.

9. The method of claim 6, wherein solving the system of
equations determines a calculated DCI payload and a seed
value used to determine an unscrambled and decoded result,
and wherein the calculated DCI payload is compared to the
unscrambled and decoded result to determine the DCI.

10. The method of claim 9, wherein responsive to a
success of re-encode technique or scrambling seed technique
in which a bit error is lower than a set threshold, DCI bit
parsing is employed.

11. The method of claim 9, wherein responsive to no
match between the calculated DCI payload and the unscrambled and decoded result, log-likelihood ratio (LLR)
optimization is employed to determine the DCI.

12. The method of claim 11, wherein the LLR optimiza-
tion comprises:

sorting received bit LLRs in descending order;

down-selecting N rows of the transformation matrix and
the set of known information based on greatest mag-
nitude LLRs to define an updated transformation
matrix; and iteratively calculating a rank of the updated transforma-
tion matrix until the rank of the updated transformation
matrix is equal to N.

13. An apparatus for determining control and scheduling
information of a network from outside the network, the
apparatus comprising processing circuitry configured to:

passively receive a radio frequency (RF) waveform of a
radio interface, using only information that can be
observed over the radio interface by the out-of-network
monitor, having downlink control information (DCI)
scrambled via a scrambling identity unknown to the
apparatus, the DCI providing the control and schedul-
ing information;

perform a cell search to determine cell identity informa-
tion for a cell via which the RF waveform is received;

perform a beam search and beam detection for the cell to
estimate a signal quality of the RF waveform;

in response to the signal quality being above a threshold
signal quality, decode scheduling information associ-
ated with the RF waveform;

detect a control channel encoded with an unknown iden-
tity based on the scrambling identity and extracting
resource elements of the control channel based on the
scheduling information;

attempt to decode the control channel via a re-encoding
technique that is tested for accuracy and, in response to
accuracy testing not passing, via a blind scrambling
seed recovery technique;

recover the DCI based on the re-encoding technique or the
blind scrambling seed recovery technique; and obtain the control and scheduling information from the
DCI.

14. The apparatus of claim 13, wherein the re-encoding
technique comprises:

attempting to decode encoded bits of common control
channel information from the control channel via an
assumed identity;

re-encoding the common control channel information
using a guessed identity to define re-encoded bits; and comparing the control channel encoded with the guessed
identity to the encoded bits to determine if the re-
encoding is successful based on a number of bit errors.

15. The apparatus of claim 14, wherein, in response to the
number of bit errors being below a threshold bit error,
recovering the DCI is performed based on the re-encoding
technique without the blind scrambling seed recovery tech-
nique.

16. The apparatus of claim 13, wherein the blind scram-
bling seed recovery technique is performed in response to a
number of bit errors being above a threshold bit error.

17. The apparatus of claim 16, wherein the blind scram-
bling seed recovery technique comprises solving a system of
equations to determine a set of unknown information asso-
ciated with the DCI, the system of equations including a set
of known information associated with the DCI, the set of
unknown information, and a transformation matrix applied
to the set of known information to obtain the set of unknown
information to determine the DCI.

18. The apparatus of claim 17, wherein solving the system of equations determines a calculated DCI payload and a seed value used to determine an unscrambled and decoded result, and wherein the calculated DCI payload is compared to the unscrambled and decoded result to determine the DCI.

19. The apparatus of claim 18, wherein responsive to a success of re-encode technique or scrambling seed technique in which a bit error is lower than a set threshold, DCI bit parsing is employed, and wherein responsive to no match between the calculated DCI payload and the unscrambled and decoded result, log-likelihood ratio (LLR) optimization is employed to determine the DCI.

20. The apparatus of claim 19, wherein the LLR optimization comprises:

sorting received bit LLRs in descending order;

down-selecting N rows of the transformation matrix and the set of known information based on greatest magnitude LLRs to define an updated transformation matrix; and iteratively calculating a rank of the updated transformation matrix until the rank of the updated transformation matrix is equal to N.

* * * * *